RE 25197
May 30, 1961     E. A. HICKS     2,986,399
RECORD REPEATING ATTACHMENT FOR PHONOGRAPH
Filed Aug. 18, 1958     2 Sheets-Sheet 1
Fig. 1
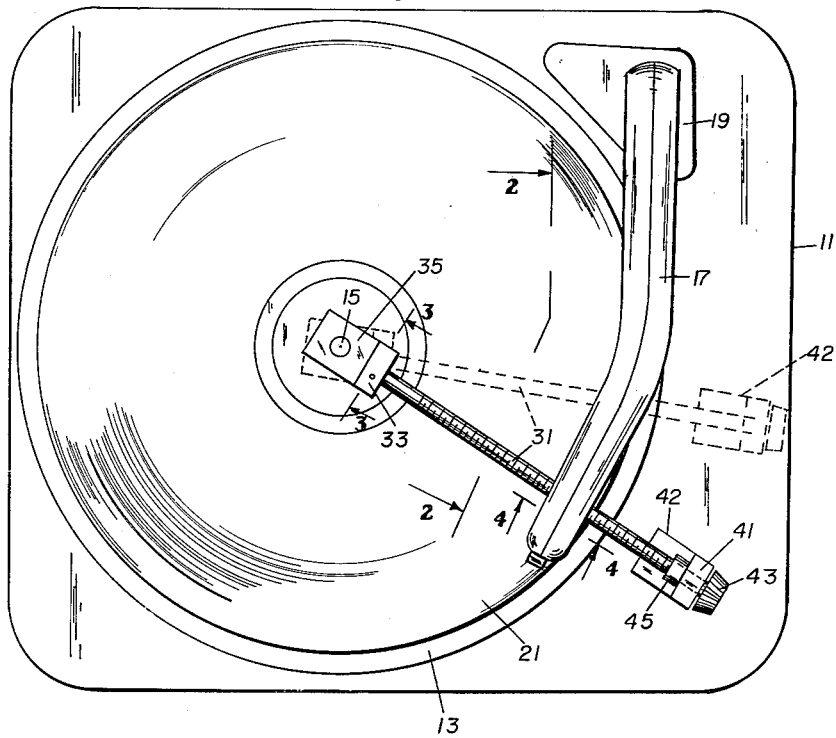
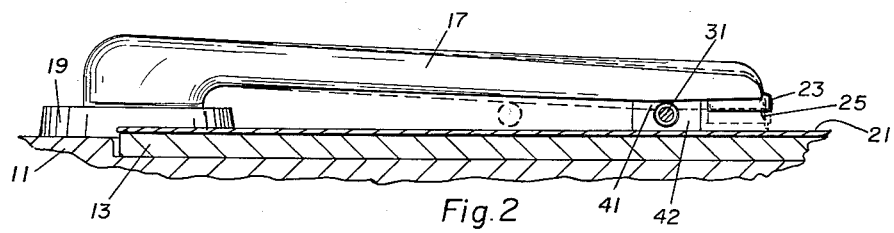
Fig. 2
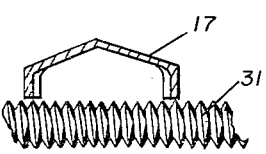
Fig. 4
Fig. 3
INVENTOR.
Emery A. Hicks
BY
Buckhorn, Cheatham & Blore
ATTORNEYS May 30, 1961  E. A. HICKS  2,986,399
RECORD REPEATING ATTACHMENT FOR PHONOGRAPH
Filed Aug. 18, 1958  2 Sheets-Sheet 2

INVENTOR.
Emery A. Hicks
BY
Buckhorn, Cheatham & Blore
ATTORNEYS

United States Patent Office 2,986,399
Patented May 30, 1961

2,986,399

RECORD REPEATING ATTACHMENT FOR PHONOGRAPH

Emery A. Hicks, 7341 SE. Ogden St., Portland, Oreg.

Filed Aug. 18, 1958, Ser. No. 755,809

2 Claims. (Cl. 274—14)

This invention relates to a tone arm control arrangement for a phonograph.

In recent years, there has been a substantial increase in the use of records in teaching foreign languages and for similar purposes. In many instances, it is contemplated that the student will repeat a word or phrase inscribed on the record and sometimes a pause is provided on the record between words or between words and phrases for this purpose. Also, such pauses enable the student to meditate on a particular word or phrase. However, frequently, a difficult word or phrase is encountered, and the student desires to orally repeat the word a number of times, or desires to re-play the part of the record containing the particular word or phrase and is not able to do so readily. He cannot lift and replace the needle with any degree of accuracy, and if he attemps to do so, most likely he is forced to listen to other words or phrases with which he is not concerned before again hearing the particular word or phrase in which he is interested. This is obviously distracting. Also, frequently if the student attempts such manual manipulation of the tone arm, the impact of the needle with the record causes damage to the record. Since it is common practice to borrow or secure records from libraries, friends, schools and the like, obviously there is considerable hesitancy on the part of the students to manually manipulate the tone arm and in many instances he does not, to the detriment of his progress.

Also, frequently the student replays a record with which he is familiar and desires to skip considerable portions thereof, but is reluctant to manually move the tone arm because of the reasons mentioned above and thus is forced to listen to material which he already knows.

A main object of the present invention is to provide a tone arm control arrangement for a phonograph whereby the tone arm may be lifted to separate the needle from the record and then gently replaced on the record in the same place from which it was removed or in any other desired place without damage to the record.

A further object of the invention is to provide such a control arrangement permitting the above operations to be carried out with any desired time interval occurring between the different operations so that the student can interrupt the play of a record without stopping operation of the turntable, and meditate on or orally repeat certain words or phrases as long as he desires, and then continue play at the same place or a different place.

A more specific object of the invention is to provide a tone arm control arrangement as above described having a threaded rod extending transversely with respect to the length of the tone arm and movable in a direction oblique to the length of the tone arm to effect lifting or lowering of the tone arm, and is also rotatable to effect shifting movement of the tone arm over the face of the record.

A further object of the invention is to provide a tone arm control arrangement in the form of an attachment which can be applied to conventional phonographs now on the market without alteration thereof.

Various other objects of the invention will be apparent from the following description taken in connection with the accompanying drawings wherein:

Fig. 1 is a plan view of the invention;

Fig. 2 is a vertical section taken along line 2—2 of Fig. 1 on an enlarged scale;

Fig. 3 is a vertical section taken along line 3—3 of Fig. 1 on a scale larger than that employed in Fig. 2;

Fig. 4 is a vertical section taken along line 4—4 of Fig. 1 on a scale larger than that employed in Fig. 3;

Figure 5:
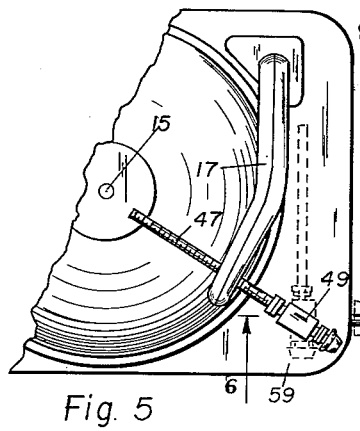
Fig. 5 is a fragmentary plan view of a modified form of the invention.
Figure 6:
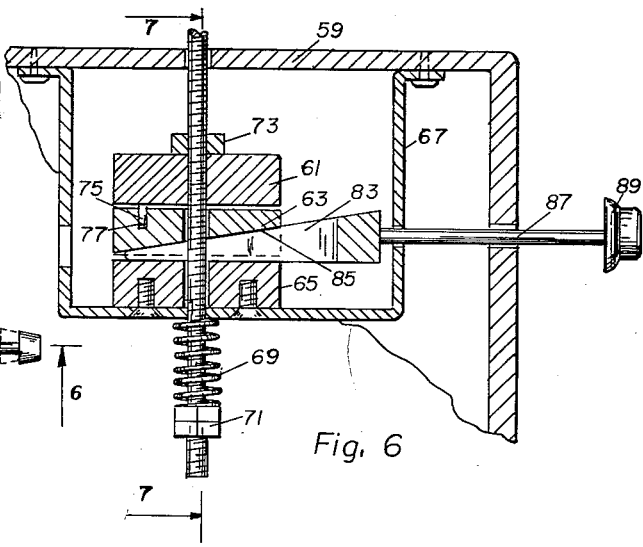
Fig. 6 is a vertical section on line 6—6 of Fig. 5.
Figure 8:
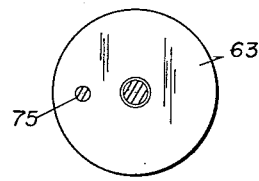
Fig. 8 is a horizontal section on line 8—8 of Fig. 7.
Figure 7:
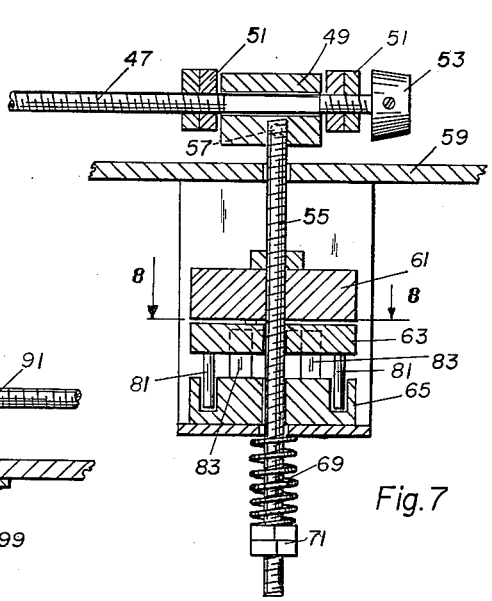
Fig. 7 is a vertical section on line 7—7 of Fig. 6.

Referring to the drawings, the particular phonograph shown, apart from the one arm control arrangement, is merely illustrative of one of the many types now on the market, and the details shown are merely for the purpose of making the environment clear and not intended to be limiting on the invention unless such limitation is specifically set forth. For convenience, certain portions of the phonograph have been shown somewhat schematically.

The phonograph includes a case or housing 11 having a turntable 13 rotatably mounted about a fixed spindle 15. The turntable is driven by any suitable means, not shown. A tone arm 17 is pivoted at one end on a base 19 for movement of the opposite end of the tone arm across the face of a record 21 supported by turntable 13. The tone arm is also pivotally mounted for vertical movement of the opposite or pick-up end thereof for the accommodation of vertical undulating movement of the record as commonly occurs in record players and also to accommodate one or more records on the turntable.

Conventionally, the tone arm slants downwardly from its pivoted end to its pick-up end, and the importance of this will be presently apparent. The pick-up end is provided with a pick-up head 23, as shown in Fig. 2, the head having a needle 25 for engagement with the record 21.

The tone arm control arrangement of the present invention is shown in the form of an attachment which may be applied to the phonograph without alteration thereof. The control arrangement includes a horizontal threaded rod 31 which is rotatably supported at its inner end in the upstanding end 33 of an inner support member 35. Preferably right-hand threads are formed on the rod. Fig. 3 shows that the inner end of the rod is provided with a groove 37, and a pin 39 in the support member fits in the groove in a manner to permit rotation of the rod but to prohibit endwise movement of the rod relative to the support member. The support member 35 rests on the record 21 and is provided with a vertical opening accommodating the fixed spindle 15. The fit of the support member on the spindle is such as to permit the member to swivel about the spindle.

The outer end portion of the rod 31 rotatably extends through the upstanding end 41 of a shiftable stand member 42 which rests on the upper face of the housing 11. The outer end of the rod 31 has knurled knob 43 secured thereto whereby the rod may be rotated or swung from the full line position shown in Fig. 1 to the dotted line position, with the stand sliding over the upper face of the housing 11. A pair of jam nuts 45 are provided on the rod 31 on the side of the upstanding end 41 remote from the knob 43. The nuts are jammed into engagement with one another in a position in slightly spaced relation to the upstanding end 41 thereby preventing the stand from shifting inwardly along the rod and yet permitting rotation of the rod.

In operation, it is apparent that the rod 31 in its inoperative dotted line position in Fig. 2 is out of contact, but in close proximity to the tone arm 17, thereby permitting the needle 25 to engage the record in the usual fashion and permitting the tone arm to undulate slightly as required by the engagement of the needle with the record. However, because of the downward inclination or slant of the tone arm, when the rod 31 is swung from its inoperative dotted line position to its operative full line position, as shown in Fig. 2, the rod 31 engages the underside of the arm and lifts the arm to separate the needle 25 from the record 21. The needle may be replaced in the same groove from which it was removed at the option of the student, after the student has meditated and/or orally repeated certain phrases or words, by merely swinging the rod back to the dotted line position.

However, if the student desires that the record repeat a certain word or phrase, the student may rotate the knob in a counterclockwise direction as viewed from the outer end face of the knob, while the rod is in the full line position shown in Figs. 1 and 2, to cause the tone arm to move outwardly. The frictional engagement of the arm with the rod is sufficient to cause the arm to follow the thread movement, and after a little practice the student can accurately rotate the knob to repeat only a desired word or a desired phrase without repeating other material. Also, when the tone arm is lifted, the rod may be rotated in the opposite direction to skip a desired part of the record and then the rod swung to its dotted line inoperative position to gently replace the needle on the record.

To play a new record, the attachment is lifted off the spindle 15, the old record replaced with a new record, and the attachment is then replaced.

Figs. 5 through 8 show a modified form of the invention which is intended for permanent installment on a record player. The modified form includes a threaded rod 47 which is shown in full lines as extending under a tone arm 17 generally toward the table spindle 15. In its full line position, the threaded rod is in an active but not necessarily operative position whereas when the rod is swung to the dotted line position shown in Fig. 5 the rod is in a totally inoperative position.

The rod 47 has a plain portion rotatably extending through a mounting block 49 and is kept from endwise movement relative to said block by two sets of jamb nuts 51. A knob 53 is fixed to the outer end of the threaded rod 47 to enable the rod to be rotated for purposes to be described hereinafter. The mounting block 49 is threaded on the upper end of a threaded stem 55, and set screws 57 hold the block in fixed relation to the stem, but allow removal of the block for purposes to be described hereinafter.

The stem 55 extends downwardly through an opening in the upper face 59 of the record player case and then through three disks 61, 63 and 65 and then through an opening in a support hanger 67. A compression spring 69 surrounds the stem 55 below the hanger 67 and bears against two jamb nuts 71 on the stem to urge the stem downwardly.

The upper disk 61 has a threaded fit with the stem 55, and a jamb nut 73 holds the disk against threading movement along the stem. The disk and stem may be rotated relative to the hanger 67 by manually turning the block 49. However, when the rod 47 is in the full line position shown in Fig. 5, the upper disk 61 has a depending pin 75 fitting in a hole 77 formed in the intermediate disk 63. The intermediate disk is nonrotatable as will be presently explained. The pin 75 thus prevents turning of the block 49 until the block and the stem 55 have been raised against the resistance of the spring 69 to separate the pin and intermediate disk. Upon such separation, the rod 47 may be swung to its inoperative dotted line position shown in Fig. 5.

The disk 63 has a central clearance hole for the stem 55 and has a pair of depending pins 81 slidably extending into matching holes in the lower disk 65 which is fixed to the hanger 67. Thus the disk 63 can move upwardly or downwardly but cannot rotate.

A bifurcated wedge member has two wedge-shaped tongue portions 83 straddling the stem 55 in spaced relation and disposed between the disks 63 and 65 and engaging an inclined cam surface 85 on the intermediate disk. The wedge member has an operating handle 87 extending through the side of the player case and being provided with a knob 89 by which the wedge member may be pressed inwardly to raise the disk 63 and thus raise the disk 61 and the stem 55 to raise the rod 47 to thereby bring the rod into engagement with the tone arm 17 to raise the tone arm and separate the needle from the record. Then the knob 53 on the rod 47 may be rotated one way or the other to shift the position of the tone arm in the manner described in connection with the first form of the invention. Then the knob 89 may be pulled out to lower the stem 55 and the rod 47 under the influence of gravity to enable the needle to re-engage the record for the purposes explained in connection with the first form of the invention.

For different instruments, the initial height of the rod 47 may be required to be different. Adjustment of the height of the rod 47 can be accomplished by loosening the jamb nut 73 and threading the disk 61 to raise or lower the position of the stem 55 relative to the disk 61. The jamb nut 73 is then tightened in place. The new position of the disk 61 will be one in which the pin 75 is in register with the hole 77 when the rod 47 is in a position extending inwardly toward the spindle of the turntable. However, if for any reason the position of the pin 75 is not in alignment with the hole 77 when the height of the rod 47 has been determined, the set screws 57 may be loosened and the pin 75 moved into alignment with the hole 77 while maintaining the rod 47 stationary at its desired position, and then re-tightening the set screws.

An advantage of the form of the invention just described is that there is nothing on the spindle that needs to be removed in changing records as is required in connection with the first form of the invention. When the rod 47 has been swung to its inoperative dotted line position, the record player can be used in normal fashion. It is further pointed out that by loosening the set screws 57, the block 49 may be removed and a knob or cover button screwed onto the upper end of the stem 55 so that no part of the unit is exposed on the upper side of the player casing.

Figure 9:
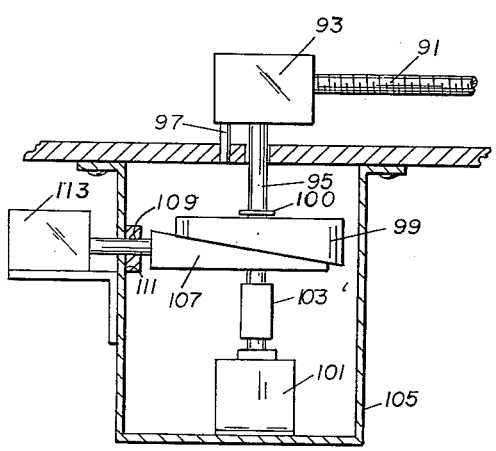
Fig. 9 is an elevational view of a further modified form of the invention.

Referring to Fig. 9, a motorized version of the invention is disclosed and includes a threaded rod 91 journaled in a beveled gear box 93 having gears, not shown, establishing a driving connection between the rod 91 and a drive shaft 95 extending down into the player casing. A pin 97 on the box fits in a hole in the casing and releasably holds the box 93 in a position with the rod 91 extending toward the spindle of the turntable of the record player. In other words, the rod is held in its active position.

A follower disk 99 is rotatably mounted on the shaft 95 below a collar 100 fixed to the shaft, and the shaft is connected to a drive motor 101 by a spline connection 103. The spline connection permits upward movement of the shaft 95 relative to the motor without interrupting the drive from the motor to the shaft. The motor is mounted on a hanger 105.

A bifurcated wedge member 107 straddles the shaft 95 and has a shaft 109 journaled in a support 111 and connected to the operating member of a double-acting solenoid 113.

In operation, with the rod 91 in the position shown, current is supplied to the solenoid 113 in a manner to shove the wedge member inwardly to raise the shaft 95 to bring the rod 91 into engagement with the tone arm to thereby separate the tone arm needle from the record. Then current is supplied to the motor to rotate the shaft 95 and therefore the rod 91 to shift the position of the tone arm. When the desired position of the tone arm has been obtained, current to the motor is stopped, and then current is supplied to the solenoid 113 to cause the wedge member 107 to return to its initial position to thereby enable the shaft 95 to lower under the influence of gravity to separate the rod 91 from the tone arm. It is pointed out that the pin 97 is long enough so that it remains in engagement with the casing during raising and lowering movement of the box 93 at the time that the shaft 95 is raised and lowered by the wedge member 107. However, the rod 91 can be swung to a totally inoperative position by manually raising the box 93 to a level higher than that to which it is raised by the cam 107 to separate the pin from the casing and enable the box and the rod 91 to be swung to inoperative positions. Another hole may be provided in the casing into which the rod 97 can fit to hold the rod in its inoperative position.

Having described the invention what is considered to be the preferred embodiment thereof, it is desired that it be understood that the invention is not to be limited other than by the provisions of the following claims.

I claim:

1. A tone arm control arrangement for a phonograph having a turntable for supporting a record, means for driving the turntable, a tone arm having a pick-up end movable across the turntable for engagement of a tone arm needle with a record on said turntable, said tone arm being inclined downwardly toward its pick-up end, said control arrangement having means including an elongated threaded member extending under said tone arm and bodily movable horizontally toward the pick-up end of the tone arm to effect engagement of said member with said arm to lift said arm to separate said needle from said record and operable when moved back to its original position for lowering said tone arm to effect engagement of said needle with said record, said member also being rotatable about its own axis and being operable when rotated and in contact with the tone arm for shifting the tone arm laterally with respect to said turntable, and means whereby said threaded member may be actuated in all of the ways mentioned above.

2. In combination, a phonograph having a housing, a turntable on said housing, a spindle for said turntable, a tone arm having a pickup end movable across the turntable for engagement of a tone arm needle with a record on said turntable, said arm having a lower surface inclined downwardly from the end remote from said pickup end toward said pickup end, a control arrangement for said arm including a rod, means for removably supporting said rod in a horizontal position on said housing and beneath said arm at a level to engage and elevate said arm when said rod is swung to a position near the pickup end of said arm and to disengage and lower said arm when swung to a position spaced from said pick-up end, said means including an inner mount for the inner end of said rod having an eye for slidably fitting on said spindle to facilitate pivotal movement of said rod in a horizontal plane about said spindle and facilitate ready removal of said inner mount from said spindle, said means also including an outer mount for the outer end of said rod having sliding contact with said housing to facilitate pivotal movement of said rod about said spindle, said outer mount rotatably engaging said rod, said rod having threads engaging the underside of said arm so that when said rod is rotated, the pickup end of said arm is advanced radially of said spindle, and means for rotating said rod.

References Cited in the file of this patent

UNITED STATES PATENTS

| | | |
|---|---|---|
| 2,066,859 | Schiler | Jan. 5, 1937 |
| 2,243,126 | Routin | May 27, 1941 |
| 2,494,063 | Simon | Jan. 10, 1950 |
| 2,536,892 | Sinnett et al. | Jan. 2, 1951 |